Patented Aug. 25, 1953

2,649,622

UNITED STATES PATENT OFFICE 2,649,622

PROCESS FOR MOLDING SYNTHETIC LINEAR POLYESTERS

John Augustus Piccard, Tonawanda, N. Y., assignor to E. I. du Pont de Nemours and Company, Wilmington, Del., a corporation of Delaware No Drawing. Application December 20, 1949, Serial No. 134,125

4 Claims. (Cl. 18—55)

This invention relates to a new and improved process for the molding of articles from a thermoplastic material and more particularly to a process for molding articles from a synthetic, linear polyester comprising essentially the linear polycondensation product of ethylene glycol and terephthalic acid, together with minor modifications thereof, which I shall call herein for purposes of convenience "polyethylene terephthalate."

The molding of thermoplastic material is done basically in two ways: (1) The material is molded by placing it directly in the heated mold cavity and forming it by pressure. The mold is then cooled to set the material, before the mold is opened. The process is called compression molding. (2) The material is heated to a soft or fluid state outside the previously closed mold and injected into the mold under pressure. The mold is kept cold, to set or harden the molded article. This is called injection molding.

The production of sound recordings affords a representative example of a typical molding operation. As is well known, phonograph records are manufactured by first cutting the groove in the original wax or plastic. The cutting tool or stylus is vibrated in the same way as a loudspeaker diaphragm, so that the sound is recorded in the form of minute variations in the position or shape of the groove. The original is then made electrically conductive, usually by condensing gold vapor on the surface, and copper plated to a substantial thickness. This copper sheet, when it is stripped off, is a perfect negative reproduction of the original record and is reproduced by a two-stage repetition of this electroforming process to make a number of negative "stampers" which are identical with the "master" or first negative, but usually have a nickel surface. These "stampers" are mounted in a hydraulic press and used as mold faces to produce the phonograph records of commerce from a plastic material.

The "stampers" are mounted in specially designed platens, each of which is provided with some form of stub center pin to hold the labels while the press is being loaded and make the center hole in the record, and with a raised ring around the edge to cut off the edge of the records, so that when two platens, each with a "stamper" mounted thereon, are brought together in the press, a shallow mold cavity is formed between them. In the usual practice a composite block of shellac, filler, and mold-parting lubricant is heated on a steam table to form a hot blank. The "stampers" are heated by passing steam through the platens, a label is placed on each center pin stub, and the hot blank is put in between them. As the press is closed, the steam is turned off and cold water is circulated through the platens while the assembly is held under a pressure of some 600–2,000 pounds per square inch (p. s. i.). As soon as it is cool, the press is opened and the record is removed, its edges are trimmed and it is put in a stack to prevent warping while it sets. Press cycles usually run between 25 seconds and a minute.

Solid records are also made from vinyl resins instead of shellac compositions. The general process and press cycles are the same, but the necessary temperatures and pressures are higher, 150° C. and 2,000 p. s. i. being usual, and the press cycles are often twice as long. In addition to solid records, there are three types of laminated records on the market: One type is a shellac base record with the two playing surfaces of a high quality composition with a thin paper backing and a core of cheap shellac and filler composition. Another type is made with an aluminum core to prevent warping, with a piece of paper on each side with a picture appropriate to the music, and a transparent sheet of a vinyl resin on each surface. The five layers are laminated together and the playing surface molded by a normal thermoplastic molding operation like other records. Children's records and smaller greeting card records are also made which are similar in appearance but made with only a thin plastic film on a plain cardboard base.

All of these processes, however, have a major drawback in common: i. e., both heating and cooling (of the mold) must be used in each cycle, which obviously is more expensive than a straight hot cycle, with the additional drawback of taking a considerable length of time per record, which in itself is necessitated by the fact that each molding operation is a two-stage affair, i. e., heating followed by cooling of the closed mold.

An object of this invention therefore, is to provide a novel process for molding thermoplastic material wherein the usual cycle of cooling the closed mold is dispensed with.

Another object is to produce in a rapid and economical fashion molded articles of polyethylene terephthalate which articles are accurate and faithful reproductions of the configurations of the mold cavities.

Still another object is to produce accurately and economically molded reproductions of sound recordings (e. g., phonograph records) from polyethylene terephthalate.

These and other objects will more clearly appear hereinafter.

The objects hereinabove stated are realized by this invention which briefly stated comprises the process whereby a blank of substantially amorphous, crystallizable polymer product wherein polyethylene terephthalate is the major and characterizing ingredient, and having an intrinsic viscosity of at least 0.3, is placed into a heated mold at a temperature between 120° C. and 220° C., and preferably between 150° C. and 200° C. The blank, when placed in the mold and heated to this elevated temperature, immediately becomes soft or molten and resolidifies soon thereafter. The resolidification occurs without the aid of cooling because of crystallization which proceeds to the point that the material is predominately crystalline, with a melting point considerably above the molding temperature. Thus, a perfect reproduction of the minute details of the mold is obtained in a minimum of time without the necessity for cooling the mold.

The synthetic linear ethylene terephthalate polymer used in the process of this invention may be polyethylene terephthalate, per se, disclosed in Whinfield and Dickson U. S. P. 2,465,319, or a linear copolyester in which ethylene terephthalate is the major and characterizing ingredient. Thus, copolymers may be used which contain a second glycol and/or dibasic acid component provided only that the crystallizability requirement given below be met. Among the many glycols that may be used in the preparation of the copolyesters there may be mentioned trimethylene glycol, tetramethylene glycol, hexamethylene glycol, diethylene glycol, propylene glycol, etc. Dibasic acids that may be used in the preparation of suitable copolyesters are sebacic, suberic, azelaic, adipic, oxydivaleric, ethylene bis p-oxybenzoic, and many others. When polyethylene terephthalate has been cooled slowly from the molten condition, or when the solidified polymer has been heated for a few minutes to a temperature between 120° C. and its melting point, examination by X-ray diffraction methods will show that it is crystalline. The copolymers of ethylene terephthalate with other polymerizable materials in many cases are also crystallizable by the same method. It appears essential that, for such a copolymer to be crystallizable, it should contain at least a preponderance of ethylene terephthalate. The upper limit of the amount of copolymerizable material which may be included without destroying the crystallizability of the copolymer varies somewhat with the particular copolymerizable material employed. When too little ethylene terephthalate, or conversely, too much copolymerizable compound, is present, the copolymer fails to yield a characteristic crystal pattern when examined by X-ray methods regardless of previous heat treatment. The crystallizable compositions can easily be recognized by the X-ray diffraction method, with previous heat treatment where necessary, and it is the crystallizable polymeric bodies to which the present invention relates.

For purposes of this invention the synthetic linear ethylene terephthalate polymer should possess an intrinsic viscosity of at least 0.3 and preferably should have an intrinsic viscosity from 0.4 to 1.5. A polymer of ethylene terephthalate having an intrinsic viscosity of less than 0.3 does not form a commercially acceptable molded article. The expression "intrinsic viscosity" denoted by the symbol $(\eta_0)$ is used herein as a measure of the degree of polymerization of the polyester and may be defined as:

$$\text{limit } \frac{ln(\eta_r)}{C} \text{ as } C \text{ approaches } 0$$

wherein $(\eta_r)$ is the viscosity of a dilute phenol-tetrachloroethane (60:40) solution of the polyester divided by the viscosity of the phenol-tetrachloroethane mixture per se measured in the same unit, and at the same temperature, and $C$ is the concentration in grams of the polyester per 100 cc. of solution.

To obtain polymer blanks in the amorphous state is a relatively simple process. The preferred method is to melt the polymer and then extrude it through a suitable orifice into cold water. This effects very rapid quenching, cools the polymer so quickly that crystallization does not occur to any noticeable extent, and then an essentially amorphous polymer blank with a softening point in the region of 120° C. is obtained. Alternatively, the molten polymer may be extruded into or between cold casting surfaces to effect the desired rapid cooling of the extruded polymer.

In many phases of the plastics industry, it is a general practice to make molded articles from flake or powder. The polyester of this invention is also amenable to such a method of molding, though it is usually necessary to dry the amorphous flake or powder thoroughly to prevent blisters which would occur when occluded or vaporizable materials, such as water, are present in the flake during molding operations. In addition, when molding by this method, the temperature is maintained preferably in the neighborhood of 200° C.

Of course, it will be realized that in any given molding operation the polymer may be extended by mixing it with fillers, such as diatomaceous earth, as well as a wide variety of plasticizers, waxes, lubricants, heat stabilizers and pigments.

The following examples of several preferred and representative embodiments further illustrate the principles and practice of this invention.

*Example I*

Molten polyethylene terephthalate of $[\eta_0]=0.5$ is poured on the flat surface of a cold aluminum block and instantly covered and pressed down with another cold aluminum block. Spacers are used to hold the minimum thickness of the resulting slab at about $\frac{1}{16}$ of an inch. The sudden chilling with the cold aluminum keeps the polymer amorphous and transparent.

A mold similar to those in common use in the industry is prepared for a phonograph record about 7 inches in diameter and about $\frac{1}{20}$ inch thick. The mold is held at 170° C., and an amorphous slab about 5½ inches in diameter of polyethylene terephthalate, prepared as above, is inserted at room temperature and the mold quickly closed and a force of 5000 lbs. (about 100 p. s. i.) is applied as fast as the heat softens the polymer. The material first softens to a nearly fluid condition and flows to the shape of the mold, and then in about ½ minute crystallizes, turning to a relatively oqaque solid. The press is then opened, and the product removed without previous cooling. The result is a phonograph record having excellent tonal and surface qualities.

*Example II*

An amorphous film of polyethylene terephthalate $[\eta_0]=0.7$, 0.002 inch thick, which is obtained by melt extrusion onto a cold roll, is folded into an envelope around a well-dried sheet of heavy cardboard, and the composite blank placed in a hot press at 170° C., as in Example I, and molded with a force of 40,000 lbs. (about 1000 p. s. i.) for a long enough period (1 min.) to crystallize the film and permit the escape of gases generated in the cardboard by the heat. The result, when removed from the press, is a phonograph record of good playing quality. The plastic playing surface, though crystalline, is so thin as to be effectively transparent and permits a clear view of any design on the surface of the cardboard.

*Example III*

A simple flash mold is made with the shape of a coat button and heated in a press to 200° C. It is then loaded with previously dried "flakes" or granular chips of polyethylene terephthalate, $[\eta_0]=0.7$, a small part of which is quite crystalline, and about $\frac{1}{3}$ of which is quite amorphous, the bulk being slightly cloudy from crystallinity. The mold is then closed to a pressure of about 5000 p. s. i. and held for one minute, which is ample time to insure complete crystallization. The result, when removed from the mold and trimmed in the manner usual for flash-molded plastic articles, is a serviceable coat button with a "terrazzo" pattern.

*Example IV*

The process of Example II is repeated using an amorphous film of a copolymer having an intrinsic viscosity of 0.53 and prepared by condensing ethylene glycol with a mixture of 93% by weight of terephthalic acid and 7% of sebacic acid. The composite blank is pressed at 150° C. and 1000 p. s. i. pressure for 40 seconds. When removed from the mold at this temperature, the phonograph record does not deform in ordinary handling and has good playing quality.

*Example V*

In similar manner to Example I, phonograph records are prepared using a copolymer of intrinsic viscosity 0.4 prepared from terephthalic acid and a mixture of 77% by weight of ethylene glycol and 23% of diethylene glycol. The composite blank is heated in the press at 135° C. and 500 p. s. i. pressure for 2 minutes. The resulting record has a clear surface and reproduced with high fidelity.

As many obvious variations and modifications may be made without departing from the spirit and scope of this invention, it is understood that said invention is in no wise restricted save as set forth in the appended claims.

I claim:

1. A process of molding articles from thermoplastic material which comprises introducing a solid crystallizable thermoplastic material consisting essentially of a major proportion of substantially amorphous linear polyethylene terephthalate, having an intrinsic viscosity of at least 0.3, into a mold and heating the material in the mold at a temperature of from 120° C. to 220° C., and under pressure of at least about 100 pounds until said material crystallizes whereby to form the desired molded article and thereafter removing said article from the mold before cooling.

2. The process of claim 1 wherein the polyethylene terephthalate has an intrinsic viscosity of from 0.4 to 1.5.

3. The process of claim 1 wherein the thermoplastic material is heated in the mold at a temperature of from 150° C. to 200° C.

4. The process of claim 1 wherein the crystallizable thermoplastic material is introduced into the mold in particle form, and is heated at a temperature of about 200° C.

JOHN AUGUSTUS PICCARD.

References Cited in the file of this patent

UNITED STATES PATENTS

| Number | Name | Date |
| --- | --- | --- |
| 2,345,629 | Reilly | Apr. 4, 1944 |
| 2,465,319 | Whinfield et al. | Mar. 22, 1949 |
| 2,503,251 | Edwards et al. | Apr. 11, 1950 |
| 2,556,295 | Pace | June 12, 1951 |